United States Patent [19]

Thielking

[11] 3,736,370

[45] May 29, 1973

[54] IMPROVED CHROMA CLAMPING CIRCUIT

[75] Inventor: Roger C. Thielking, North Syracuse, N.Y.

[73] Assignee: General Electric Company, Portsmouth, Va.

[22] Filed: Jan. 18, 1971

[21] Appl. No.: 107,229

[52] U.S. Cl. ............................178/5.4 R, 178/7.3 DC

[51] Int. Cl. ............................H04n 9/00, H04n 5/18

[58] Field of Search ......................178/5.4 R, 7.3 DC, 178/7.5 DC; 315/30; 330/11

[56] References Cited

UNITED STATES PATENTS

| | | | |
|---|---|---|---|
| 3,647,944 | 3/1972 | Anderson | 178/5.4 R |
| 2,751,550 | 6/1956 | Chase | 307/296 |
| 3,555,175 | 1/1971 | Griepentrog | 178/5.4 R |

*Primary Examiner*—Robert L. Griffin
*Assistant Examiner*—George G. Stellar
*Attorney*—Frank L. Neuhauser, Oscar B. Waddell, Joseph B. Forman, W. J. Shanley, Stanley C. Corwin and F. W. Powers

[57] ABSTRACT

A clamping circuit for use in a color television receiver. The DC voltage level of color signal transmission paths is reestablished during horizontal retrace periods by applying a clamping pulse derived from the horizontal output transformer directly to the transmission path. The maximum excursion of the voltage thus applied is limited by a diode reverse-biased by means of a reference voltage network, which includes a transistor resistively coupled between a voltage source and ground. The transistor passes a constant flow of current such that changes in the value of the voltage source are added to the reverse bias on the limiting diode. The maximum voltage of the clamping pulse is thus varied to reflect changes in the value of the voltage source.

10 Claims, 1 Drawing Figure

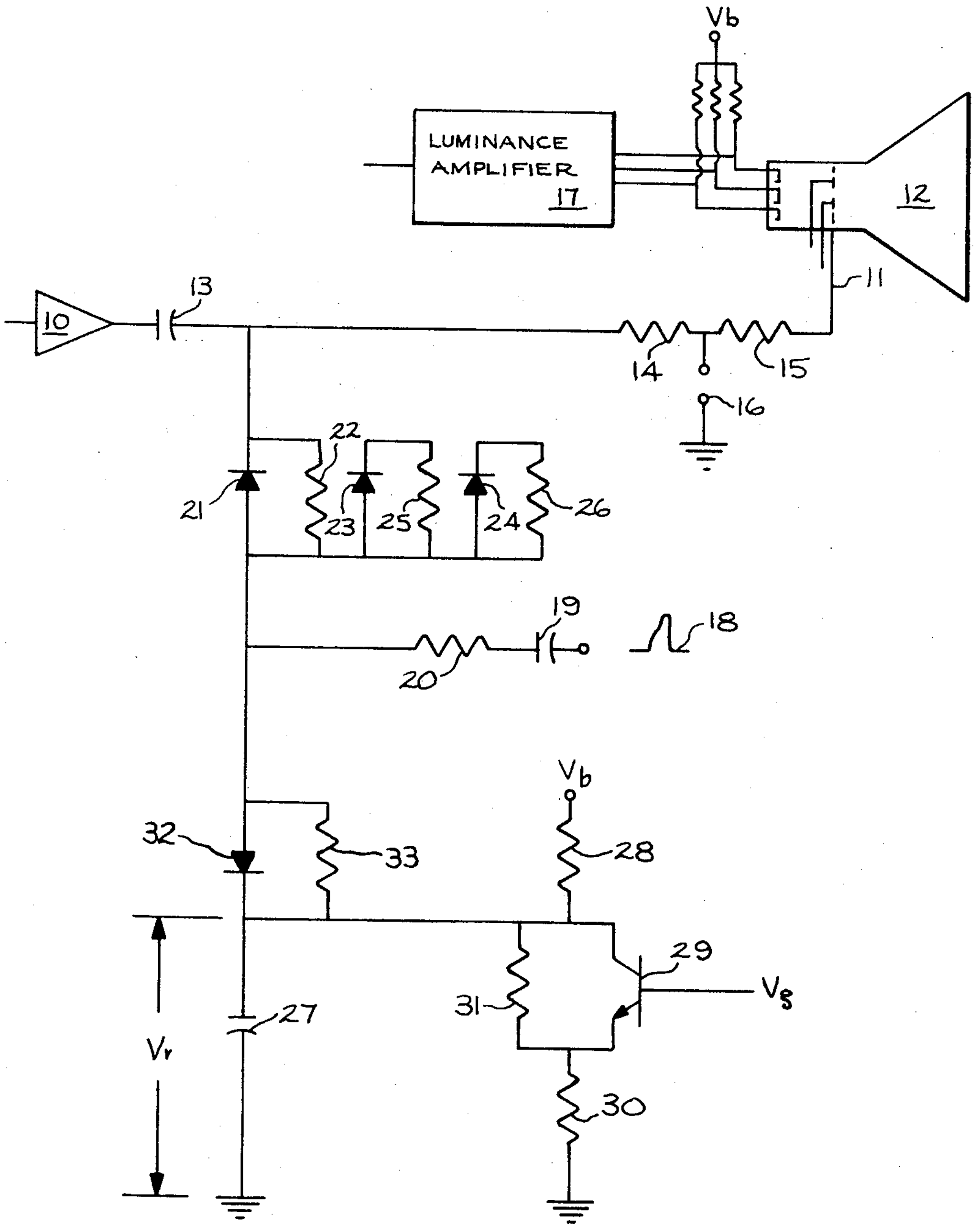
INVENTOR
ROGER C. THIELKING
BY James E Espe
HIS ATTORNEY

IMPROVED CHROMA CLAMPING CIRCUIT

BACKGROUND OF THE INVENTION

The present invention relates to color television receivers and, more specifically, to improved means for maintaining a desired voltage level upon selected portions of the color signal circuitry. In transmitting color signals to the control electrodes, or grids of a cathode ray tube of a color television receiver, it is often desirable to provide DC isolation between the final color signal amplification stages and the associated electrodes of the cathode ray tube. Such isolation is ordinarily attained by connecting a capacitor in series with the color signal transmission path such that the AC portion of the color signal is transmitted unattenuated to the control grids. Since the potential difference between the cathode and the grid of a cathode ray tube electron gun determines the flow of electrons therefrom it is imperative that, in addition to modulating the grid voltage, the DC value of grid voltage be maintained within a predetermined range.

The capacitive coupling utilized in the color signal path tends to integrate the values of the signals transmitted thereby, such that the voltage of the path "floats" or maintains no fixed relationship with the voltage of the cathode of its associated electron gun. The result is that while the stream of electrons resulting from the voltage difference between the cathode and grid continues to be modulated, the absolute value of the voltage difference, and thus of the electron stream, causes the brightness of the image displayed upon the tube to depart from its intended value. For this reason, it has been found desirable to periodically drive the voltage of the signal transmission path to a predetermined reference level. This operation is most advantageously effected during horizontal retrace time when the electron gun is temporarily cut off. Often a device such as a diode is connected between the color signal transmission path and a point of controlled voltage. A clamping pulse is periodically applied which causes the normally back-biased diode to conduct, applying a predetermined voltage to the color signal path. Ordinarily, an amplification device is provided for generating a suitable pulse in response to a signal from an appropriate source. Use of such an amplifier, however, has the disadvantage of adding an extra component to the receiver, increasing the cost and complexity and inevitably adding to the chances of failure.

In many applications the mere provision of a clamping pulse of a fixed magnitude is not sufficient to insure proper operation of the receiver, since the voltage of the source from which bias voltages for the cathodes and grids are derived tends to fluctuate. Since it is the relative voltage between the cathode and its associated grid, rather than the absolute voltage of the grid, which must be maintained it is desirable to cause the level of the clamping voltage to "track" or follow the level of the voltage applied to the cathodes. While means have been divised to perform this function, they have often comprised complex, expensive circuits, adding to the cost and complexity of the television receiver.

Thus it would be desirable to provide simple, inexpensive means for applying a clamping voltage to a color signal transmission path. Moreover, it would be advantageous to provide a color television receiver with accurate, inexpensive means for causing the maximum value of a clamping pulse to change in response to fluctuations in a voltage source which biases the electrodes of a cathode ray tube.

It is therefore an object of the present invention to provide simplified, economical means for applying a clamping pulse to the color signal transmission paths of a color television receiver.

It is another object of the present invention to provide improved means for causing the voltage level of a clamping pulse to track fluctuations in the value of a biasing voltage.

SUMMARY OF THE INVENTION

Briefly stated, in accordance with one embodiment of the present invention, the foregoing objects are achieved by providing first unidirectional conducting means for coupling a clamping pulse to the color signal path. The pulse is derived from a suitable device, such as a utility winding on the horizontal pulse transformer, and coupled directly to a first side of the unidirectional conducting means. In order to limit the amplitude of the applied clamping pulse, and to cause the maximum value of the pulse to vary with changes in the value of a biasing voltage, second unidirectional conducting means are connected between the point at which clamping pulses are applied and a point of reference potential. A second side of the second unidirectional conducting means is maintained at a reference potential which determines the voltage at which the device will begin to conduct. The value of the clamping pulse is thus prevented from exceeding that of the reference potential.

Reference potential is provided by resistively coupling a controlled, variable-impedance device across a voltage source. The variable-impedance device passes a current flow of a constant magnitude, producing a constant voltage drop across a series-connected resistive element. The voltage drop across the variable-impedance device constitutes a reference potential which remains constant so long as the value of the voltage source does not fluctuate. Since fluctuations in value of the voltage source cannot cause current transmitted by the variable impedance device to vary, changes in voltage appear unattenuated across the variable-impedance device and are presented to the second-mentioned unidirectional conducting device for determining the voltage at which the device will begin to conduct. Changes in reference potential are thus constrained to be of the same magnitude as changes in the biasing voltage.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment, taken in connection with the accompanying drawing in which the single FIGURE is a schematic drawing of selected portions of a color television receiver, showing the inventive clamping circuit.

DESCRIPTION OF THE PREFERRED EMBODIMENT

Referring now to the drawing, a color signal amplifier 10 supplies a color signal to an electrode, such as a control grid 11 of the cathode ray tube 12 of a color television receiver. The signal which in the present embodiment may be a color difference signal, is conveyed to the grid by means of a transmission path including a DC blocking capacitor 13 and current-limiting resistors 14 and 15. A spark gap 16 affords a shunt path for overvoltages. A luminance amplifier 17 impresses predetermined voltage levels upon an opposing electrode, such as the cathodes of the cathode ray tube 12, for providing the proper degree of brightness or luminance to the image displayed upon the face of the tube. Each of the cathodes is biased by resistively connecting it to a source of biasing voltage $V_b$.

In order to facilitate the description of the present embodiment, only color signal amplifier 10 and the circuitry associated therewith will be described, it being understood that similar color ampifiers and corresponding circuitry are to be coupled to the remaining control grids of cathode ray tube 12. Blocking capacitor 13 allows the transmission of only AC signals from color amplifier 10 to the associated grid of cathode ray tube 12. Due to the integrating action of capacitor 13 the DC level of the transmission path, if not otherwise operated on, will be that voltage which is the average of the signal transmitted through the capacitor. Since, however, it is the potential difference between a cathode and its corresponding grid which determines the luminance of the display produced, it is of manifest importance that the DC level of the color difference signal transmission path, and thus that of the grid, be maintained at a proper DC value.

In order to effect a predetermined voltage level, it is common practice to apply a bias voltage to the color difference signal transmission path during retrace time. This activity may be termed DC restoration or, in the present context, clamping. In the illustrated embodiment clamping pulse 18 is applied to the color difference signal transmission path of the receiver by means of a coupling capacitor 19, a resistor 20 and a first diode 21 which is shunted by bleeder resistor 22. The distal side of capacitor 19 is coupled to a winding of the horizontal transformer (not shown) such that a positive-going pulse 18 having a total amplitude of approximately 150 volts is applied to the circuit. Diodes 23 and 24 shunted by resistors 25 and 26 respectively couple the inventive circuitry to other color difference signal paths (not shown) and function in the same manner as diode 21.

As the voltage applied to the anode of diode 21 begins to exceed the voltage of the color difference signal path, which may be taken as the voltage of capacitor 13, diode 21 begins to conduct. The voltage of the transmission path then rises to that of the voltage being applied to the anode of diode 21 by way of coupling capacitor 19 and resistor 20. As the pulse 18 diminishes and the voltage across coupling capacitor 19 decreases diode 21 becomes back-biased, preventing a reverse flow of current and "clamping" the voltage of the color difference signal transmission path to the maximum value of the applied clamping pulse 18. As the voltage at the coupling capacitor 19 decreases the voltage differential created between capacitor 19 and the color difference signal transmission path increases, causing current to flow downwardly through bleeder resistor 22. Charge now slowly accumulates upon the resistor side of capacitor 19, facilitating the rapid conduction of diode 21 when the next clamping pulse is applied.

While the above-described circuitry serves to periodically reestablish the voltage level of the color difference signal path without the use of amplifiers or other active devices, it will be seen that the magnitude of the clamping voltage pulse applied to capacitor 19 is solely a function of voltage provided by the horizontal pulse transformer and is independent of other parameters, most notably the value of biasing voltage $V_b$. If voltage $V_b$ were invariant, the circuit so far described would be adequate to clamp the color difference signal path to a voltage bearing the desired relationship to the cathode bias voltage. However, in most television receivers the values of the various biasing voltages tend to fluctuate. It will thus be seen that unless the maximum voltage of the clamping pulse, as applied to diode 21, is caused to change with variations in biasing voltage, an activity referred to as "tracking," the luminance of the displayed image will be subject to undesirable variations. For this reason a pulse limiting network comprising second diode 32, bleeder resistor 33 and capacitor 27 are provided in conjunction with the series combination of dropping resistor 28, transistor 29, and resistor 30. Resistor 31 is connected in shunt with the emitter-collector terminals of transistor 29. The base terminal of transistor 29 is maintained at a controlled, constant voltage $V_q$ such that the collector-to-emitter current of transistor 29 remains substantially constant over a predetermined range of collector-to-emitter voltages. The series combination of resistor 28, transistor 29 and resistor 30 are placed in series between a source of voltage $V_b$ and ground, the voltage $V_r$ at the collector of transistor 29 constituting a reference voltage which is applied to the cathode of second diode 32 for back-biasing the diode.

When a positive-going pulse 18 is produced at the horizontal transformer it traverses coupling capacitor 19 and resistor 20 and is applied to the anodes of both diodes 21 and 32. Diode 21 begins to conduct rapidly as the applied voltage rises above that of the color signal transmission path, while diode 32 does not conduct until the applied voltage exceeds the reference voltage $V_r$ established at its cathode. Due to the rapid rise of pulse 18, however, diodes 21 and 32 enter conduction at substantially the same time.

It will be seen that $V_r$ comprises the sum of the voltage drops across resistor 30 and the collector-emitter terminals of transistor 29. Since the voltage $V_q$ applied to the base of transistor 29 is regulated, the transistor allows only a current of a constant magnitude to flow regardless of variations in the value of voltage source $V_b$. Since the current flow across the transistor is substantially constant, the voltage drop across resistor 30 remains practically constant. Further, since current through transistor 29 does not vary, the voltage drop provided by dropping resistor 28 also remains substantially constant. No increased voltage drop can then occur across resistor 28, and excursions in the value of $V_b$ are transmitted unattenuated across resistor 28 and are added to the original reference voltage $V_r$. Shunting resistor 31 provides a current path in the event that transistor 29 fails or is removed from the circuit, preventing the full value of $V_b$ from being applied to the cathode of 32. While the presence of resistor 31 detracts somewhat from the constant-current characteristic supplied by transistor 29, the value of resistor 31 is of a high order such that current through resistor 28 remains substantially constant.

It will now be appreciated that the value of reference voltage $V_r$ is constrained to change by the same amount as does bias voltage $V_b$. The maximum excursion allowed the clamping pulses applied to diode 21 is thus modified to maintain a fixed differential between the voltage of the control grids and that of the cathodes of cathode ray tube 12.

In one clamping circuit constructed in accordance with the present teaching, circuit components having the following values were utilized:

| | |
|---|---|
| capacitor **13** | 0.01 microfarads |
| resistor **14** | 3.3 K ohms |
| resistor **15** | 1 K ohms |
| capacitor **19** | 0.01 microfarads |
| resistor **20** | 4.7 K ohms |
| diodes **21,23,24,32** | D T 230 H (General Electric) |
| resistors **22,25,26,33** | 2.2 M ohms |
| capacitor **27** | 0.01 microfarads |
| resistor **28** | 200 K ohms |
| transistor **29** | 2 N 3859 A |
| resistor **30** | 22 K ohms |
| resistor **31** | 68 K ohms |

It will thus be seen that the present invention provides means for applying a suitable clamping pulse to a color difference signal transmission path without the need for an amplifier or other active device. Further, the reference voltage network of the invention provides the desired "tracking" function without the use of elaborate circuitry or expensive voltage regulating devices, relying upon three resistors and an inexpensive signal transistor.

As will be evident from the foregoing description, certain aspects of the invention are not limited to the particular details of construction of the example illustrated, and it is therefore contemplated that other modifications or applications will occur to those skilled in the art. It is thus intended that the appended claims shall cover such modifications and applications as do not depart from the true spirit and scope of the invention.

What is claimed is:

1. In a color television receiver including a transmission path for transmitting a color signal to a first electrode of a cathode ray tube, means for supplying an unregulated biasing voltage to a second electrode of the cathode ray tube, said unregulated biasing voltage being susceptible of fluctuations, means for periodically establishing the transmission path at a predetermined voltage level, comprising:

clamping circuit means for periodically applying a first voltage to the transmission path;

first unidirectional conducting means having a first and a second side, said first side being coupled to said means for applying the first, clamping voltage;

means for deriving a second, reference voltage which fluctuates in substantially the same amounts as said biasing voltage comprising the series combination of resistor means and variable impedance means for passing a substantially, constant current in the presence of varying voltages impressed thereacross;

means for connecting said series combination across a source of unregulated biasing voltage; and means for coupling said second, reference voltage to said second side of said unidirectional conducting means to limit the value of said first voltage.

2. In a color television receiver including means for producing periodic voltage pulses, a cathode ray tube, a transmission path for transmitting a color signal to a first electrode of the cathode ray tube, and means for applying an unregulated biasing voltage susceptible of variations to a second electrode of the cathode ray tube:

circuit means for applying periodic voltage pulses to the transmission path;

means for transmitting periodic voltage pulses to said circuit means;

variable impedance means for passing a substantially constant current in the presence of varying voltages impressed thereacross;

first resistive means coupled in series with said variable impedance means, the series circuit so comprised being coupled between a point of biasing potential and a point of reference potential; and second circuit means coupling the junction of said circuit means and said means for transmitting periodic voltage pulses, and the junction between said variable impedance means and said first resistive means.

3. In a color television receiver including a transmission path for transmitting a color signal to a first electrode of a cathode ray tube, means for applying an unregulated biasing voltage to a second electrode of the cathode ray tube and, means for periodically establishing the transmission path at a predetermined voltage level with respect to said second electrode, comprising:

first circuit means for periodically applying a clamping voltage to the transmission path; and variable impedance means for passing a substantially constant current over a range of voltages thereacross;

first resistive means coupled to said variable impedance means;

means for coupling the series combination of said variable impedance means and said first resistive means between a point of unregulated potential and a point of reference potential; and second circuit means coupling the intersection of said first resistive means and said variable impedance means to said first circuit means;

whereby the maximum excursion of the clamping voltage is caused to vary with the biasing voltage.

4 The invention as defined in claim 3, wherein said second circuit means comprises unidirectional conductive means.

5. In a color television receiver including a transmission path for transmitting a color signal to an electrode of a cathode ray tube, means for periodically establishing the transmission path at a predetermined voltage level, comprising:

first unidirectional conducting means having a first and a second side, said second side being coupled to the transmission path;

clamping circuit means for applying a first, clamping voltage to said first side of said first unidirectional conducting means;

second unidirectional conducting means having a first and a second side, said first side being coupled to said means for applying said first clamping voltage; and means for deriving a second, reference voltage comprising variable impedance means for passing a substantially constant current over a range of voltages impressed thereacross, first resistive means for coupling said variable impedance means to a source of biasing voltage, and means for applying the voltage impressed across said variable impedance means to said second side of said second unidirectional conducting means.

6. The invention as defined in claim 5 wherein said first and said second unidirectional conducting means are diodes.

7. The invention as defined in claim 6, wherein said means for applying a first, clamping voltage comprises the series combination of second resistive means and capacitor means adapted to be coupled between the first side of said first unidirectional conducting means and a source of periodic voltage pulses.

8. The invention as defined in claim 7, further including third resistive means connected in shunt with said first unidirectional conducting means, and fourth resistive means connected in shunt with said second unidirectional conducting means.

9. The invention as defined in claim 8, wherein said variable impedance means comprises the series combination of transistor means and fifth resistive means.

10. The invention as defined in claim 9, wherein said means for applying a second, reference voltage further includes sixth resistive means connected in parallel with said transistor means.

* * * * *